United States Patent
Knorr

(10) Patent No.: US 11,866,043 B2
(45) Date of Patent: Jan. 9, 2024

(54) POWER CONTROL DEVICE FOR CONTROLLING AN ELECTRIC MACHINE IN A VEHICLE TRAILER

(71) Applicant: Robert Bosch GmbH, Stuttgart (DE)

(72) Inventor: Slawa Knorr, Ramsau am Dachstein (AT)

(73) Assignee: ROBERT BOSCH GMBH, Stuttgart (DE)

( * ) Notice: Subject to any disclaimer, the term of this patent is extended or adjusted under 35 U.S.C. 154(b) by 702 days.

(21) Appl. No.: 16/967,116

(22) PCT Filed: Mar. 14, 2019

(86) PCT No.: PCT/EP2019/056382
§ 371 (c)(1),
(2) Date: Aug. 3, 2020

(87) PCT Pub. No.: WO2019/179866
PCT Pub. Date: Sep. 26, 2019

(65) Prior Publication Data
US 2021/0031770 A1    Feb. 4, 2021

(30) Foreign Application Priority Data

Mar. 22, 2018 (DE) .......................... 102018204391.4

(51) Int. Cl.
*B60W 30/18*    (2012.01)
*B60W 10/08*    (2006.01)
(Continued)

(52) U.S. Cl.
CPC ......... *B60W 30/18009* (2013.01); *B60D 1/01* (2013.01); *B60D 1/62* (2013.01);
(Continued)

(58) Field of Classification Search
None
See application file for complete search history.

(56) References Cited

U.S. PATENT DOCUMENTS

2010/0065344 A1* 3/2010 Collings, III ............. B60L 3/10
                                                              180/2.1
2010/0318241 A1   12/2010 Post, II et al.
(Continued)

FOREIGN PATENT DOCUMENTS

DE    102010002652 A1 *  9/2011 .............. B60T 13/08
DE    102010042907 A1    4/2012

OTHER PUBLICATIONS

International Search Report for PCT/EP2019/056382, dated May 24, 2019.

*Primary Examiner* — Todd Melton
*Assistant Examiner* — Jason R Roberson
(74) *Attorney, Agent, or Firm* — NORTON ROSE FULBRIGHT US LLP; Gerard A. Messina

(57) ABSTRACT

A power control device is provided for controlling an electric machine in a vehicle trailer. The electric machine is coupled to at least one wheel of the vehicle trailer to be able to convert mechanical rotation power at the wheel and electric power at the electric machine into one another. The power control device is configured to control a mechanical power output and/or a mechanical power input of the electric machine and is configured to control the mechanical power output and/or the mechanical power input of the electric machine as a function of a present driving condition of a towing vehicle pulling the vehicle trailer.

6 Claims, 2 Drawing Sheets

(51) Int. Cl.
*B60D 1/01* (2006.01)
*G01C 21/36* (2006.01)
*B60W 10/18* (2012.01)
*B62D 59/04* (2006.01)
*B60D 1/62* (2006.01)

(52) U.S. Cl.
CPC ............ *B60W 10/08* (2013.01); *B60W 10/18* (2013.01); *B62D 59/04* (2013.01); *G01C 21/36* (2013.01); *B60W 2300/14* (2013.01)

(56) References Cited

U.S. PATENT DOCUMENTS

2015/0204741 A1* 7/2015 Hagan .................... B60L 53/14
    180/65.21
2018/0086227 A1* 3/2018 Healy ................ B60L 15/2018

\* cited by examiner

POWER CONTROL DEVICE FOR CONTROLLING AN ELECTRIC MACHINE IN A VEHICLE TRAILER

FIELD

The present invention relates to a power control device for controlling an electric machine in a vehicle trailer.

BACKGROUND INFORMATION

Vehicle trailers, for example, camper trailers, may be pulled by a towing vehicle. The vehicle trailer often has a separate power supply, for example, in the form of a 12 V battery, which is conventionally recharged by a power source, for example, a generator in the towing vehicle.

A vehicle trailer may be provided with a higher-performance power accumulator, for example, in the form of a lithium-ion battery packet. To be able to recharge it efficiently, an electric machine may be provided in the vehicle trailer. This electric machine may act as a generator and may be coupled to one or multiple wheels of the vehicle trailer to be able to convert mechanical power into electric power, so that the electric power may be used to charge the power accumulator. The electric machine may possibly also be used as a motor to drive the vehicle trailer with the aid of energy stored in the power accumulator.

There may be a need to improve an energy management in a vehicle trailer pulled by a towing vehicle, which is equipped with an electric machine and possibly a high-performance energy accumulator.

SUMMARY

In accordance with an example embodiment of the present invention, a power control device for controlling an electric machine in a vehicle trailer is provided. Advantageous refinements and improvements of the present invention are described herein.

Specific embodiments of the present invention may advantageously enable intelligent energy management in a vehicle combination, in particular being able to efficiently and/or intelligently recharge the power accumulator in a vehicle trailer with the aid of the electric machine or be able to withdraw electric energy according to the situation to drive the electric machine.

According to an aspect of the present invention, a power control device is provided, which is configured to control a mechanical power output and/or a mechanical power input of the electric machine in a vehicle trailer. The power control device is distinguished in that it is configured to control the mechanical power output and/or the mechanical power input of the electric machine as a function of a present driving condition of a towing vehicle pulling the vehicle trailer.

Concepts for specific embodiments of the present invention may be considered to be based, among other things, on ideas and findings described hereinafter.

An electric machine provided in a vehicle trailer has previously been operated without considering which driving condition the towing vehicle is in presently.

On the one hand, the driving condition of the towing vehicle pulling the vehicle trailer generally directly influences the driving condition of the vehicle trailer itself, however. For example, if the towing vehicle is decelerated, the vehicle trailer runs toward the towing vehicle to a certain extent and is also decelerated, additional brakes being able to be activated in the vehicle trailer to assist the brake application due to the overrun.

On the other hand, the driving condition of the towing vehicle may often be measured or detected easily on the basis of measured variables correlating thereto. In the mentioned example, a relative distance between towing vehicle and vehicle trailer changes, for example, upon deceleration of the towing vehicle due to the run of the vehicle trailer. This change of the relative distance may be measured or detected easily. Alternatively, diverse electrical signals are usually generated in any case in the towing vehicle, which supply an inference about the present driving condition and may thus be used by the power control device to control the electric machine in the vehicle trailer.

For example, the vehicle trailer may include a drawbar for attachment to the towing vehicle and for transmitting forces between the towing vehicle and the vehicle trailer. The power control device may include an electromechanical sensor system in this case, which, as a function of a force presently transmitted by the drawbar or as a function of a present relative distance between the towing vehicle and the trailer, generates a sensor signal to control the mechanical power output and/or the mechanical power input of the electric machine. In other words, the drawbar may transmit drag forces and/or thrusts between the towing vehicle and the vehicle trailer. The drawbar may change its length. A presently transmitted drag force or a present relative distance between, for example, the center of gravity of the towing vehicle and the center of gravity of the vehicle trailer may be measured with the aid of suitable electromechanical sensor systems. Based on sensor signals of such sensor systems, the electric machine may be controlled appropriately for the situation with respect to its power output or power input, i.e., directly or indirectly as a function of the present driving condition of the towing vehicle.

To implement this, a deflection lever may be provided on the drawbar, which is displaced into various orientations as a function of a relative distance between the towing vehicle and the trailer. The sensor system may generate the sensor signal as a function of the present orientation of the deflection lever. In other words, a deflection lever may be situated on the drawbar, which is pivoted as the trailer runs toward the towing vehicle, for example. The change of the orientation of the deflection lever may be measured easily using a sensor assembly which includes an angle sensor. It may accordingly be detected if the towing vehicle is decelerated in relation to the trailer and if such a change of the present driving condition of the towing vehicle is detected, the power input of the electric machine may be adapted suitably to decelerate the trailer suitably and recuperate energy.

A force transmission unit may engage in this case at the deflection lever, which causes a force on a brake of the vehicle trailer as a function of an orientation of the deflection lever, with the aid of which a braking force caused by the brake is controlled. In other words, the deflection lever may be a component of a conventional overrun brake, in which a force transmission unit, for example, in the form of a drag rope or a linkage, is actuated upon a run of the trailer toward the towing vehicle with the aid of the deflection lever in order to actuate brakes of the vehicle trailer. The sensor system of the power control device may thus be integrated in a simple manner into a mechanism to be provided in any case at the drawbar of the trailer.

According to one specific embodiment of the present invention, the force transmission unit may be configured in such a way that in the event of a run of the vehicle trailer toward the towing vehicle, a braking force caused by the brake is first generated when the deflection lever has been reoriented at least up to a minimum orientation angle. The sensor system may generate the sensor signal in this case as a function of the present orientation of the deflection lever in the case of orientation angles less than the minimum orientation angle. In other words, the deflection lever and the force transmission unit of an overrun brake cooperating with it may be configured in such a way that in the event of a run of the trailer toward the towing vehicle, the brakes of the trailer are only actuated when the deflection lever has been pivoted by at least the minimum orientation angle. Only a minor run of the trailer does cause a small reorientation of the deflection lever, but this remains within a "dead angle" or play, within which a force sufficient for activating the brakes is not yet effectuated via the force transmission unit. It may be advantageous to measure in particular present changes of the orientation of the deflection lever with the aid of the sensor system of the power control device, as long as the orientation angle is less than the minimum orientation angle, i.e., as long as the brakes of the trailer are not yet actuated in spite of minor overrun toward the towing vehicle. In this way, a power input of the electric machine may be increased early to thus decelerate the trailer largely synchronously with the towing vehicle and to recuperate released kinetic energy efficiently at the same time.

A damping element may be situated in this case between the deflection lever and the force transmission unit, which transmits a force between the deflection lever and the force transmission unit in a damped manner. The damping element may establish a mechanical coupling between the deflection lever and the force transmission unit for this purpose, which passes on jerky changes during the force transmission between the trailer and the towing vehicle largely directly to the force transmission unit, on the one hand, while in contrast slow changes during such a force transmission are damped. On the one hand, in this way in the event of a sudden intense brake application caused by the towing vehicle, the brakes of the trailer may be activated with preferably little time delay, i.e., without the deflection lever firstly having to move by the minimum orientation angle, for example. On the other hand, in the case of a slowly initiated brake application, a displacement of the deflection lever caused in the event of the run of the trailer may be detected and the recuperation by the electric machine in the trailer may be activated before the brakes of the trailer decelerate it excessively.

While in the above-explained specific embodiments, the present driving condition of the towing vehicle was detected on the basis of changes accompanying this in the relative position between the towing vehicle and the trailer and changes at the drawbar of the trailer thus effectuated, it may alternatively also be provided that a data interface is provided in the power control device, via which the control signals are to be received, which are generated in the towing vehicle and which specify a piece of information about the present driving condition. In other words, in modern towing vehicles control signals are usually generated, with the aid of which the towing vehicle is controlled or which enable an inference about the present driving condition of the towing vehicle. Such control signals may be generated, for example, when a brake pedal of the towing vehicle is actuated, when a gas pedal of the towing vehicle is actuated, when a driver assistance system influences the present driving condition of the towing vehicle, etc. In the power control device described here, a data interface may be provided, via which these control signals may be tapped and may thus be used by the power control device to control the power output or power input of the electric machine.

In particular, the power control device may include a transmitter, which is to be coupled to a vehicle control unit in the towing vehicle and which generates the information about the present driving condition based on signals of the vehicle control unit and transmits it to the data interface of the power control device. Such a transmitter, for example, in the form of a so-called dongle, in particular an OBD dongle, may tap signals directly at the vehicle control unit, using which it controls the present driving condition of the towing vehicle. The transmitter may transmit this information to the data interface of the power control device. A wired or preferably a wireless signal transmission may be used for this purpose.

According to one specific embodiment of the present invention, the vehicle control unit is configured to generate a brake actuation signal. In other words, the transmitter may be coupled to the vehicle control unit of the towing vehicle which registers, for example, that the brake pedal was actuated and thereupon generates a brake actuation signal. Such a brake actuation signal may already be generated when the brake pedal is only pressed down slightly, so that a significant brake application is not yet requested, however, brake lights of the towing vehicle have already been activated due to the brake actuation signal. By tapping and transmitting the brake actuation signal to the power control device, it may thus already activate the electric machine early to decelerate the trailer and recuperate.

In a further embodiment of the present invention, the power control device may be configured to control the mechanical power output and/or the mechanical power input of the electric machine as a function of GPS data and/or navigation data relating to a route of the vehicle trailer. In other words, the power control device may use GPS data and/or navigation data, to be able to derive inferences from these data about a presently prevailing driving condition of the towing vehicle and thereupon be able to activate suitably the electric machine of the trailer. For example, it may be apparent from GPS data and/or navigation data that the vehicle combination is presently on a downgrade and the towing vehicle therefore has to brake the trailer. The power control device may use this indirectly derivable information to actively brake the trailer with the aid of the electric machine and recuperate energy. The trailer may possibly even be decelerated to such an extent with the aid of the electric machine that in this way the towing vehicle is also decelerated and its kinetic energy is also recuperated.

BRIEF DESCRIPTION OF THE DRAWINGS

Specific embodiments of the present invention are described hereinafter with reference to the figures, with neither the figures nor the description to be interpreted as restricting the present invention.

The figures are solely schematic and are not true to scale. Identical reference numerals identify identical or identically-acting features in the figures.

DETAILED DESCRIPTION OF EXAMPLE EMBODIMENTS

Figure 1:
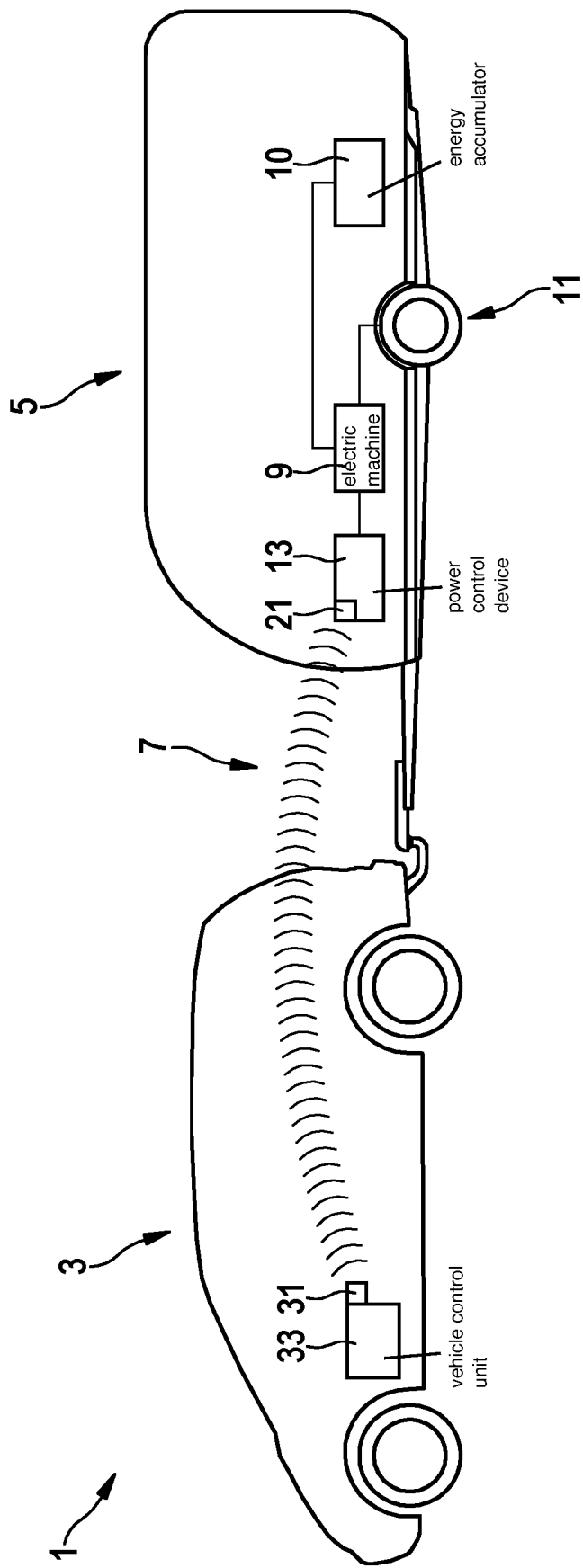
FIG. 1 shows a vehicle combination including a towing vehicle and a vehicle trailer including a power control device according to one specific example embodiment of the present invention.

FIG. 1 shows a vehicle combination 1 including a towing vehicle 3 and a vehicle trailer 5. Vehicle trailer 5 is coupled via a drawbar 7 to towing vehicle 3. An electric machine 9 is provided in vehicle trailer 5, which is mechanically coupled to at least one wheel 11 of vehicle trailer 5 to convert rotation power at wheel 11 into electric power in a recuperating manner or vice versa to drive wheel 11 by inputting electric power. Recuperated energy may be stored, for example, in an energy accumulator 10 such as a lithium-ion battery packet and may be withdrawn from it again as needed.

Electric machine 9 is controlled with respect to its power input or power output by a power control device 13. According to an example embodiment of the present invention, the control of electric machine 9 takes place in consideration of a present driving condition of towing vehicle 3. Various measures may be implemented to obtain a piece of information about the present driving condition of towing vehicle 3.

In a first embodiment of the present invention, drawbar 7 may be modified to obtain a piece of information relating to a relative position between towing vehicle 3 and trailer 5 or to obtain a piece of information relating to forces transmitted between these two.

Figure 2:
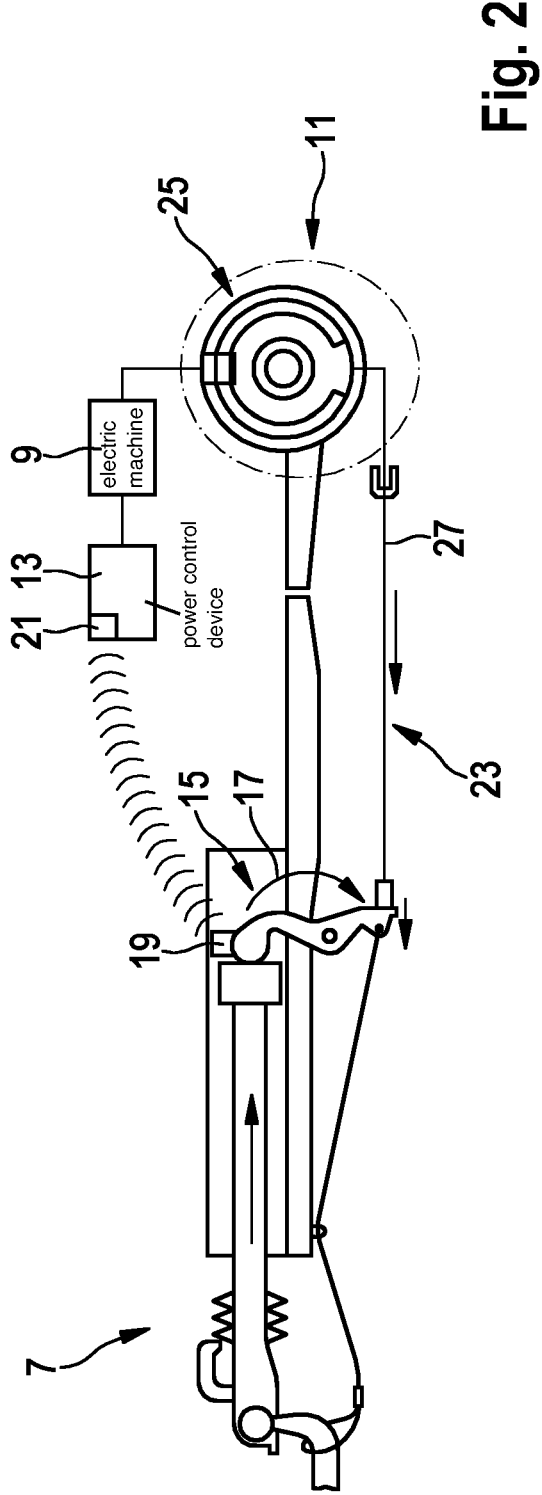
FIG. 2 shows components of a vehicle trailer including a power control device provided thereon according to one specific example embodiment of the present invention.
Figure 3:
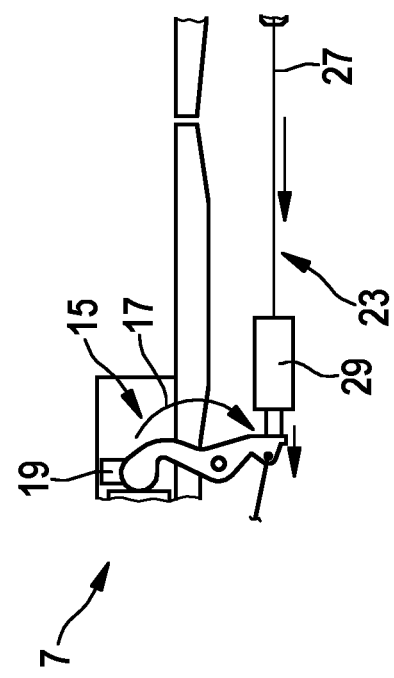
FIG. 3 shows components of a vehicle trailer having an alternative power control device provided thereon according to a further specific example embodiment of the present invention.

For this purpose, as shown in FIGS. 2 and 3, a deflection lever 15 may be provided at drawbar 7, which is pivoted during the run of trailer 5 toward towing vehicle 3, due to the change accompanying this of a present relative distance between towing vehicle 3 and trailer 5, and thus changes its orientation, as illustrated by arrow 17. A sensor system 19 is provided at deflection lever 15, which generates a sensor signal as a function of a present orientation of deflection lever 15 and transmits it, preferably wirelessly, to a data interface 21 of power control device 13. The sensor signal thus specifies, for example, how intensely trailer 5 is running toward towing vehicle 3 upon braking of towing vehicle 3 and is thus a measure of presently transmitted drag forces or thrust forces or a present relative distance between towing vehicle 3 and trailer 5.

Deflection lever 15 may be part of a braking system of trailer 5. During the run of trailer 5 toward towing vehicle 3, deflection lever 15 actuates a force transmission unit 23, for example, in the form of a brake cable 27, so that a force is caused on a brake 25 of a trailer 5 as a function of an orientation of deflection lever 15, with the aid of which the braking force of brake 25 is controlled.

Force transmission unit 23 may be configured here in such a way that deflection lever 15 initially has to be moved by a minimum orientation angle before force transmission unit 23 causes a braking force at brake 25. For example, brake cable 27 may be slightly loose, so that deflection lever 15 initially has to overcome a play before brake cable 27 is tensioned. Sensor system 19 may also detect orientation changes of deflection lever 15 which are less than the minimum orientation angle. Therefore, based on sensor signals of sensor system 19, power control device 13 may already activate electric machine 9 for recuperation before trailer 5 has significantly run toward towing vehicle 3 and in particular before brakes 25 of trailer 5 are activated. Kinetic energy of trailer 5 may thus be recuperated very efficiently.

In the example partially shown in FIG. 3, a damping element 29 is additionally situated between deflection lever 15 and brake cable 27 acting as force transmission unit 23. Due to damping element 29, on the one hand, a mechanical connection may always be provided without play between deflection lever 15 and brake cable 27 and thus mechanical brake 25 may engage instantaneously, for example, in the event of a failure of the electrical system in trailer 5. On the other hand, deflection lever 15 may be slightly pivoted during slowly beginning decelerations of towing vehicle 3 without this immediately resulting in an actuation of brake 25, so that the reorientation of deflection lever 15 is detected by sensor system 19 and the sensor signal generated thereupon may be used for the control of the recuperation by power control device 13.

In an alternative embodiment of the present invention, as indicated in FIG. 1, data interface 21 of power control device 13 communicates with a transmitter 31 in towing vehicle 3. Transmitter 31 is coupled to a vehicle control unit 33. Vehicle control unit 33 generates signals, for example, a brake actuation signal, on the basis of which the present driving condition of towing vehicle 3 may be inferred. On the basis of such signals, transmitter 31 may transmit suitable pieces of information to power control device 13, so that it may control the power input or power output of electric machine 9 correctly for the situation.

Designs of possible specific embodiments of the present invention are explained once again hereinafter with partially different wording.

Vehicle trailers 5 such as camper trailers having luxury equipment usually have a separate 12 V battery. This battery is used to supply electrical consumers in the decoupled state independently of the towing vehicle and overhead power, i.e., within the scope of on autonomous energy supply. These consumers are usually comfort consumers such as lighting and water pumps, but also movers for parking the trailer. Camper trailers are conventionally supplied with electric energy from towing vehicle 3 while driving and the battery is recharged. Solar cells are also used to assist recharging the battery. Typically, 12 V lead accumulators are used as batteries. The energy content of these batteries is relatively small and is therefore only sufficient for short autonomous phases. A standardized 13-pole plug exists as an interface between trailer 5 and towing vehicle 3. The battery is also recharged via this plug. This approach is designed for 12 V and does not permit power transmission at a higher voltage level of, for example, 48 V. In addition, the charging current for the 12 V battery in the trailer is strictly limited by the relatively small cable cross sections.

There are considerations of increasing the voltage level of the batteries in the trailer, for example, to 48 V, with the goal of achieving a higher capacity and performance and/or at low weight. Solar cells and wheel-driven electric machines are discussed as energy sources, which operate as generators during braking and may thus recharge the batteries.

The power control device provided here is to enable efficient control or regulation of the generator or motor power on wheel-driven generators.

Initially, a first implementation will be explained:

Braked trailers 5 have a pull rod at a drawbar 7, which actuates a deflection lever 15 during braking, whereby a so-called application force results on brake cable 27 and decelerates trailer 5 via wheel brake 25.

By attaching a sensor system 19 including an angle sensor in the deflection point, i.e., for example, at an axis of deflection lever 15, an electrical sensor signal may be generated which is a function, i.e., for example, proportional, to a drawbar force.

The electrical sensor signal generated by the angle sensor is relayed to a power control device 13, for example, in the form of a control device, preferably in trailer 5, and processed further there. Power control device 13 computes a setpoint torque or a setpoint power therefrom and activates electric machine 9 acting as a generator accordingly.

By decoupling the application force from the deflection (pre-tensioning of the drag rope) in a certain small angle range below a minimum orientation angle, a certain idle travel may be generated. This idle travel is characterized in that at low deflection angles of deflection lever 15, wheel brake 25 is not directly actuated. Ideally, this idle angle is used to utilize the power of electric machine 9 preferably extensively and to convert the excess kinetic energy during braking into electric energy. Mechanical brake 25 is to remain preferably inactive and is only to be used with full trailer battery 10 or high decelerations or upon failure of electric machine 9. This method enables efficient use of the excess kinetic energy, because it is not mechanically dissipated as usual in friction brake 25, but rather electrically recuperated.

An additional mechanical decoupling of the application force from deflection lever 15 in the desired angle range may also be implemented by an installation of a damper 29, for example, a gas pressure damper or an oil pressure damper and/or a spring element. The provided installation position is shown in FIG. 3. The advantage of this approach is that the mechanical connection is maintained and mechanical brake 25 is available as a fallback level in the event of failure of the electrical system.

The provided example may also be used for a motor assistance. The approach here is to assist or relieve towing vehicle 3 via electric machine 9 installed in trailer 5 in case of sufficiently high electric power. The power of electric machine 9 may be regulated, for example, with the aid of the angle sensor in sensor system 19 in such a way that a positive force in the direction of the towing vehicle does not result via drawbar 7, but rather the pull rod always remains loaded with tension and trailer 5 thus only becomes more or less "lighter." This is enabled in that in the case of driving via trailer 5, the angle sensor would supply a positive value, which is not desired in motor operation. As a result, the motor power would be reduced again. This principle has the advantage that towing vehicle 3 may not be pushed by trailer 5, which may be critical for the stability of vehicle combination 1.

A second implementation is explained hereinafter:

In the above embodiment, it was described how the activity of mechanical brake 25 on trailer 5 may be avoided and excess kinetic energy may be electrically recuperated. A second step in the direction of increasing efficiency may be to reduce the activity of the mechanical brake on towing vehicle 3 or to avoid it entirely in certain driving situations.

One possible approach is to incorporate further pieces of information from towing vehicle 3, for example, the braking signal, into the system of power control device 13. This may be carried out, for example, via a wireless OBD dongle, which is connected to an OBD socket of towing vehicle 3 and sends the required signals to power control device 13. This would have the advantage that the driver could trigger the recuperation in trailer 5 via a light actuation of the brake pedal in towing vehicle 3, without mechanical brake 25 already closing. Another example is the use of a gas pedal signal to avoid recuperation from being possible during acceleration, but rather towing vehicle 3 receiving motor assistance, for example, with the aid of electric machine 9 in trailer 5.

Intelligent energy management for trailer 5 or also for entire vehicle combination 1 may be implemented by a use of GPS data and navigation data (for example, destination).

Vehicle-combination-spanning energy management may be implemented in that, for example, with sufficiently full trailer battery 10, the vehicle electrical system of towing vehicle 3 may be supplied via a DC-DC converter and the 13-pole plug and the vehicle generator of towing vehicle 3 may thus be switched off.

Many customer requirements are implementable hereby via various strategies such as "arrive preferably efficiently" or "arrive with preferably lots of electric energy."

As a supplemental embodiment, it is provided that a wireless control unit or operating unit is used within reach of the driver, i.e., for example, at the steering wheel. This control unit is preferably to communicate via wireless signal transmission (for example, Bluetooth, WLAN, etc.) with a second unit attached to trailer 5, for example, to drawbar 7, which is in turn electrically connected as interface 21 to power control device 13 for electric machine 9. The functionality is to be similar to a retarder in a truck. That means, in the event of an upcoming braking maneuver, for example, in the event of a longer downgrade, the driver may manually set/preselect the recuperation power of trailer 5 in multiple stages. This has the advantage that not only the kinetic energy of trailer 5, but rather also that of towing vehicle 3 is available for the recuperation, mechanical brake 25 is conserved, and vehicle combination 1 is stabilized by the stretching action. A further advantage of the operating unit is that by integrating a visual display, the driver may be informed about a present recuperation condition, a charge level of the battery, etc.

In summary, specific embodiments of the present invention may enable effective recuperation of the excess kinetic energy in electric energy, since friction losses of mechanical brake 25 are minimized. In principle, a fallback level may be implemented upon failure of the generator power, since the mechanical approach still functions. Specific embodiments may be implemented with minor and cost-effective integration expenditure, since, for example, a drawbar mechanism does not have to be changed or only has to be changed slightly. The principle provided herein may also be used for assisting or relieving towing vehicle 3. Overall, intelligent energy management is possible in vehicle combination 1. This enables a $CO_2$ savings by supporting the vehicle electrical system and self-powering of the camper.

Finally, it is to be noted that terms such as "having," "including," etc. do not exclude other elements or steps and terms such as "a" or "one" do not exclude a plurality.

What is claimed is:

1. A power control device for controlling an electric machine in a vehicle trailer, the electric machine being coupled to at least one wheel of the vehicle trailer to be able to convert mechanical rotation power at the wheel and electric power at the electric machine into one another, the power device configured to:

control a mechanical power output of the electric machine and/or a mechanical power input of the electric machine; and control the mechanical power output of the electric machine and/or the mechanical power input of the electric machine as a function of a present driving condition of a towing vehicle pulling the vehicle trailer, wherein:

the vehicle trailer includes a drawbar for attachment to the towing vehicle and for transmitting forces between the towing vehicle and the vehicle trailer, and wherein the power control device includes an electromechanical sensor system configured to generate a sensor signal indicative of the driving condition, wherein the mechanical power output of the electric machine and/or the mechanical power input of the electric machine is controlled as a function of a force presently transmitted by the drawbar or as a function of a present relative distance between the towing vehicle and the vehicle trailer, a deflection lever is provided at the drawbar, which is displaced into various orientations as a function of a relative distance between the towing vehicle and the vehicle trailer, the sensor system configured to generate the sensor signal as a function of a present orientation of the deflection lever, a force transmission unit engages at the deflection lever, which causes a force on a brake of the vehicle trailer as a function of an orientation of the deflection lever, using which a braking force caused by the brake is controlled, and a damping element is situated between the deflection lever and the force transmission unit, which transmits a force in a damped manner between the deflection lever and the force transmission unit.

2. The power control device as recited in claim 1, wherein the force transmission unit is configured in such a way that in the event of a run of the vehicle trailer toward the towing vehicle, the braking force caused by the brake is generated only when the deflection lever has been reoriented at least by a minimum orientation angle, and the sensor system is configured to generate the sensor signal as a function of the present orientation of the deflection lever at orientation angles less than the minimum orientation angle.

3. The power control device as recited in claim 1, wherein the power control device includes a data interface via which control signals are to be received, which are generated in the towing vehicle and which specify a piece of information about the present driving condition.

4. The power control device as recited in claim 3, wherein the power control device includes a transmitter configured to be coupled in the towing vehicle to a vehicle control unit and which generates the information about the present driving condition based on signals from the vehicle control unit and transmits it to the data interface of the power control device.

5. The power control device as recited in claim 4, wherein the vehicle control unit is configured to generate a brake actuation signal.

6. The power control device as recited in claim 1, wherein the power control device is configured to control the mechanical power output of the electric machine and/or the mechanical power input of the electric machine, as a function of GPS data and/or navigation data relating to a route of the vehicle trailer.

\* \* \* \* \*